April 2, 1957 H. L. HORWITZ ET AL 2,787,659

COMBINATION TELEPHONE AND DICTATION SYSTEM

Filed May 20, 1955 3 Sheets-Sheet 1

INVENTORS
HENRY L. HORWITZ
MERLE E. HOMAN
BY
AGENT

April 2, 1957 H. L. HORWITZ ET AL 2,787,659

COMBINATION TELEPHONE AND DICTATION SYSTEM

Filed May 20, 1955 3 Sheets-Sheet 2

INVENTORS
HENRY L. HORWITZ
MERLE E. HOMAN
BY
AGENT

April 2, 1957 H. L. HORWITZ ET AL 2,787,659

COMBINATION TELEPHONE AND DICTATION SYSTEM

Filed May 20, 1955 3 Sheets-Sheet 3

INVENTORS
HENRY L. HORWITZ
MERLE E. HOMAN
BY R. A. Perry
AGENT

United States Patent Office 2,787,659

Patented Apr. 2, 1957

2,787,659

COMBINATION TELEPHONE AND DICTATION SYSTEM

Henry Leopold Horwitz, Nutley, and Merle Edward Homan, Packanack Lake, N. J., assignors to International Telephone and Telegraph Corporation, New York, N. Y., a corporation of Maryland Application May 20, 1955, Serial No. 509,837

11 Claims. (Cl. 179—6)

This invention relates to a combined telephone and dictation system. Its general object is to provide facilities which will enable any designated telephone of a telephone system to become operatively extended to an idle one of a group of dictation machines upon the calling of a number assigned to the group, whereby the dictation machines are placed in a common pool and may be used as required by a number of persons.

A further object is to provide such a system in which a connected dictation machine may be controlled from a sub-station without the use of any equipment or wiring thereat additional to that provided at an ordinary telephone sub-station.

A feature of the invention is that each dictation trunk is provided with a trunk circuit controllable from the calling telephone station so as to exercise the necessary controls over the associated dictating machine, whereby during dictation the latter may be started and stopped alternately in response to a subscriber dialling the same predetermined digit on the impulse sender dial which is normally used for dialling the number of a wanted subscriber station. The use of the same digit is obviously of considerable convenience, since, when dictating, the subscriber can permit his finger to remain in the appropriate finger hole without having to remember which digit he last dialled. If the digit 1 is used for the purpose, the finger disk has only to be rotated a minimum amount.

A further feature is that provision is made in the dictation trunk circuits whereby they are able to exercise the same start and stop control over the dictating machine irrespective of whether the calling sub-station impulse sender dial, or alternatively, a special push button or switch which modifies the condition of the substation loop circuit, is actuated to effect such start and stop control over the dictating machine.

The invention will be described as applied to a private automatic telephone system of a multi-hundred line capacity. Such a system employs selectors having levels leading respectively to the hundreds groups of lines. It will be appreciated, however, that our invention is not limited in its application to systems of this kind but may be readily adapted for systems of any size and systems using any type of switch for selection.

In the system to be described, a spare selector level is employed for trunks extending to the respective dictation machines of the pool, whereby an idle dictation machine is taken for use upon the dialling of the corresponding single digit number, such as, for example, 9.

Figure 1:
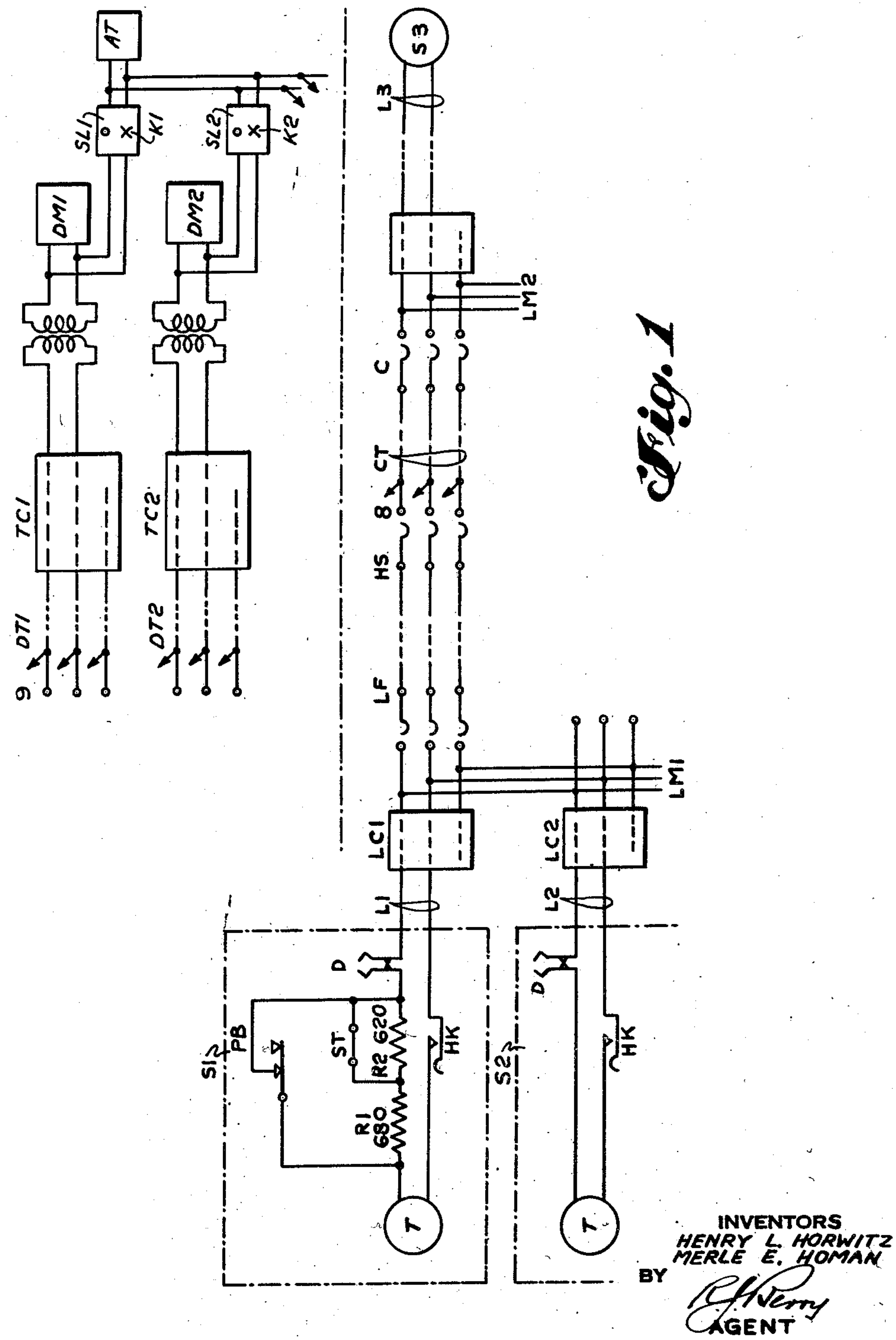
Figure 2:
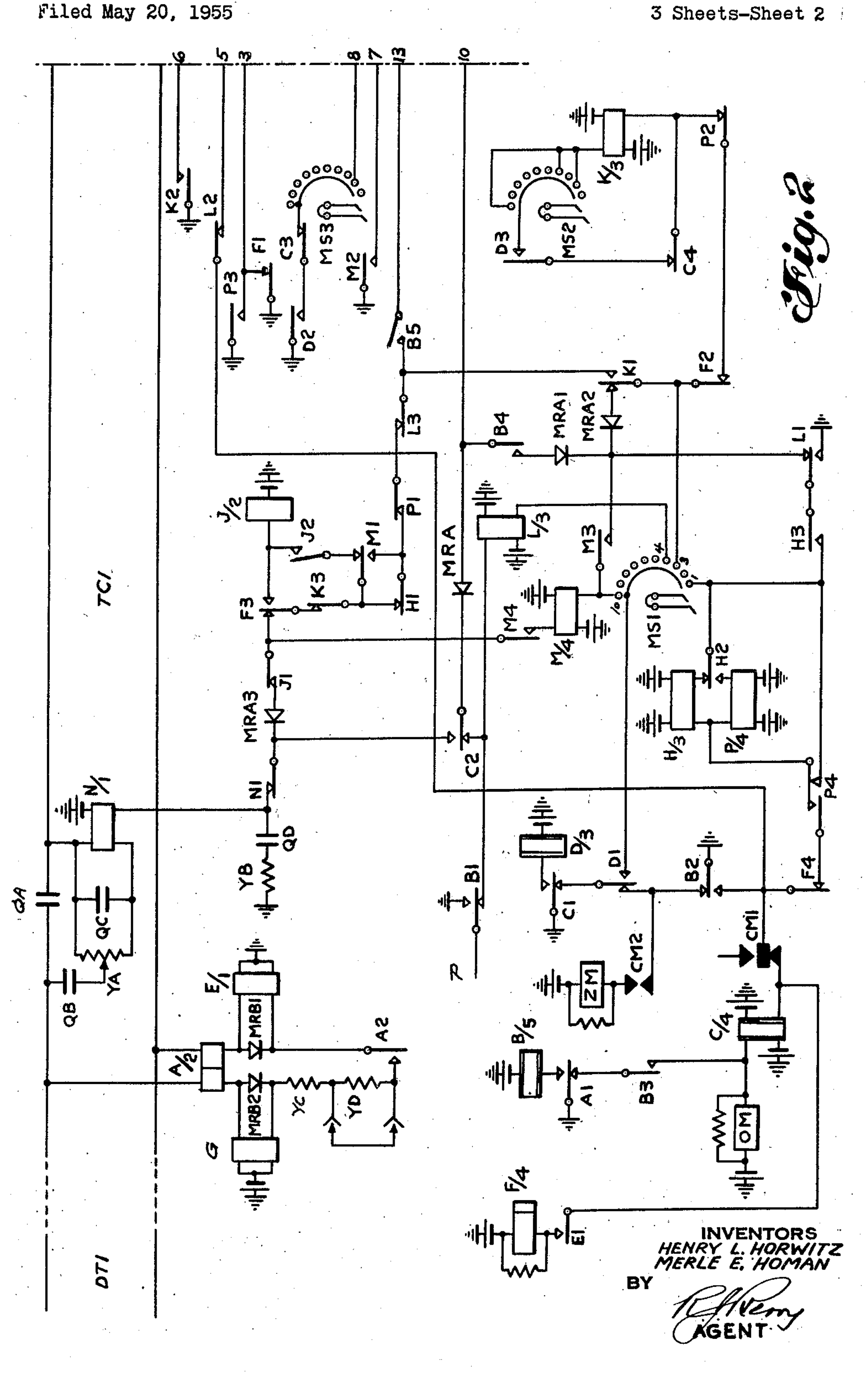

The above and other objects and features of our invention will appear from the following description taken in conjunction with the accompanying drawings in which Fig. 1 is a switching diagram of a system embodying the invention;

Fig. 2 is a circuit diagram of a dictation trunk circuit, and

Figure 3:
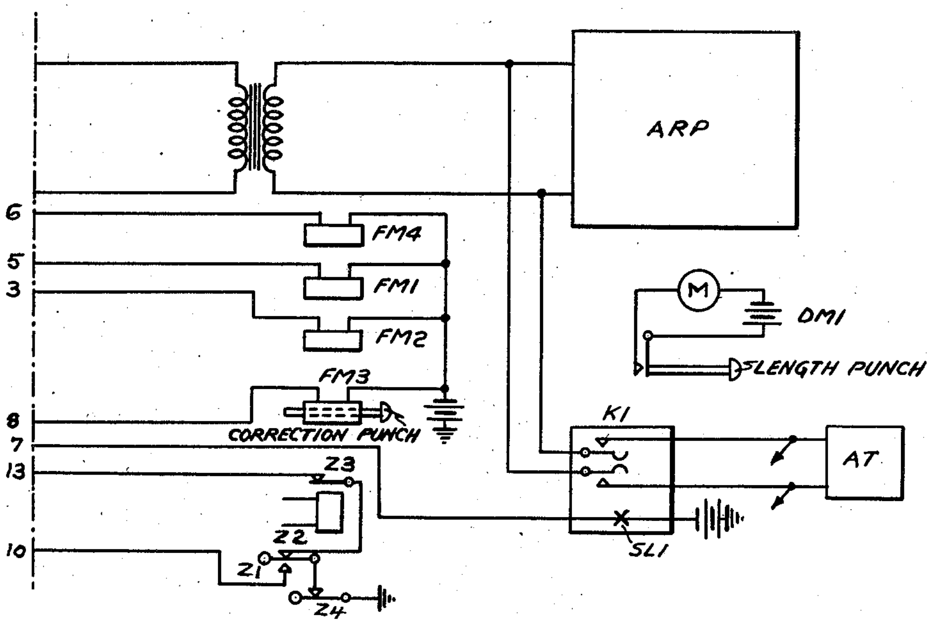

Fig. 3, which should be placed to the right of Fig. 2 shows diagrammatically the dictating apparatus and its control equipment and an attendant's position.

Referring first to Fig. 1, the switching system comprises several hundred lines divided into the usual decimal groups of one hundred lines each. L1 and L2 are two lines of one of the hundred line groups. They respectively serve telephone stations S1 and S2 and are equipped with line circuits LC1 and LC2. The lines L1 and L2 are accessible to a line finder LF and are connected by line multiple LM1 to bank contacts of other finders and connectors serving the hundred line group. Line L3 may be similar to L1 and L2 and in the same or another hundred line group. It is accessible to connector C and is connected by line multiple LM2 to other finders and connectors serving the same hundred line group.

The line finders are linked to respective hundreds selectors, the line finder LF being linked to a hundreds selector HS. Several hundred selectors have their bank contacts connected in multiple level-by-level in the usual manner giving them common access to the several levels of trunks, usually 10. As many of these levels of trunks as needed are used for access to the respective groups of connectors. Connector trunk CT is one of the trunks which extends from selector level 8 to connector C.

From selector level 9, dictation trunks DT1, DT2, etc., extend through respective trunk circuits TC1, TC2, to dictation machines DM1, DM2, respectively, so that the trunk circuits TC occupy the trunking position of a group of connectors.

An attendant's telephone AT may be selectively connected to the dictation trunks by respective keys K1 and K2 when the attendant is signaled by one of the individual signal lamps SL1, SL2.

If it is desired to make a call from station S1 on line L1, or station S2 on line L2, closure of the subscriber's loop causes line circuit LC1 or LC2 to respond. An idle line finder, such as LF, is thereby caused to connect its associated selector HS to the calling line L1 or L2.

If it is desired to call line L3, the digit 8 is now dialled. Selector HS is thereby stepped to level 8 and it thereupon selects an idle connector trunk, such as CT, extending to connector C. The subsequent dialling of the tens and hundred digit in the number of the wanted line L3, steps the connector C to the corresponding level and to the contact set of L3. Station S3 on the called line L3 is then rung in the usual manner until the call is answered, the connection being released when the hand sets (not shown) are replaced.

If it is desired to dictate, say from station S1, after a line finder LF and selector HS are seized, the digit 9 may be dialled in the usual manner causing selector HS to step to level 9 and then to hunt in that level for an idle dictation trunk DT.

For a system of less than one hundred lines the hundreds selectors HS would be eliminated and the line finders LF would be linked directly to respective connectors C. Then, if the connectors C are of the type adapted to trunk hunt and switch through on a desired level, the connections to dictation trunks would be taken from that level, such as the ninth.

Stations from which the dictation machines DM, are to be used need not be equipped with any special apparatus but through the trunk circuits, such as TC1, TC2, etc., are able to exercise all the necessary controls over the dictating machines DM1, DM2, etc., by actuating their impulse sender dials to send predetermined digits, as will be fully described. If, however, it is preferred that the starting and stopping of the dictating machine be controlled by a push button or switch, such as the push button PB at station S1, it is arranged that the actuation of this push button shall increase the line loop resistance by removing a shunt from one or more resistors, such as R1, R2, inserted in the loop.

Hook switch contacts HK, dials D and telephone apparatus T, are of the usual type provided at telephone sub-stations. The circuit arrangement (not shown) of the line circuits LC, line finders LF, selectors HS and connectors C are of the well known loop dialling type.

The dictation machines DM1, DM2, etc., are of the remote controlled type, well known in the art. As shown in Fig. 3, the machine DM1, is provided with function control magnets FM1, FM2, etc., which control the performance of corresponding functions of the machine. The usual amplifying, recording and play-back equipment is represented at ARP. A driving motor M is provided for driving the recording equipment.

The trunk circuit TC1, Fig. 2, includes a plurality of control relays and a ten-point minor spring-restored stepping switch MS of well-known type.

A detailed description of the operation of the system when a station, such as S2, not equipped with a push button PB, desires to dictate will first be given.

When the hand set is lifted, hook switch contacts HK, Fig. 1, close, causing line circuit LC2 to operate to start an idle finder such as LF, to search for the calling line L2. When the line L2 is found, the selector HS is prepared for operation in the usual manner and the usual dial tone is sent back to S2.

When the dictation digit 9 is then dialled by manipulating the usual calling device D, a series of nine momentary interruptions is made in the closed line L2, thereby causing selector HS to step to its ninth level and to rotate thereon in search of an idle trunk DT1 having an idle indicating battery potential on the sleeve lead P thereof. It will be assumed that dictation trunk DT1, Fig. 2, is the first one found idle and that it is, therefore, seized. Trunk DT1 is normally marked idle by a connection to its lead P from the negative side of the exchange battery by way of the upper non-inductive winding of relay L and back contacts B1 of relay B.

The high impedance pulsing relay A operates over the positive and negative conductors of the trunk DT1 and the calling station loop, and provides transmitter feed over windings of relay E and retardation coil G to the calling station when the connection is cut through in a normal manner by the preceding equipment. Relay A at contacts A1 closes a circuit for a slow release relay B, which remains operated from seizure to disconnect and does not release during pulsing of relay A. Relay B at contacts B1 connects ground to the sleeve lead P to hold the preceding equipment and to mark the trunk DT1 busy. Relay B at front contacts B2 grounds the wire 5 to energize a function magnet FM1, Fig. 3, to start the motor M of the dictating machine, and closes a circuit over the normal springs CM1 of the minor switch MS for the lower winding of a slow release relay C, and at contacts B3 a pulsing circuit from the back contacts A1 of relay A is prepared for the minor switch stepping magnet OM in parallel with the upper winding of relay C. Relay C is a double-wound slow-release relay which signals the end of a dial pulse series. It remains operated from seizure to disconnect except for a momentary release at the end of each digit. It is operated by relay B over its lower winding and holds on pulses to the end of the pulse train over its upper winding after the minor switch MS steps off normal and contacts CM1 open the circuit to its lower winding.

Relay C upon operating closes at contacts C1 a circuit for a slow release relay D. Relay C at contacts C2 also extends the availability lead 10 from dictating apparatus to a buzzer relay N. This relay N is arranged to operate and release very rapidly on a self-interrupting basis at contacts N1 over its right hand winding. The tone induced in its left hand winding is fed into the voice circuit across condenser QA. Resistor YA provides a means for adjusting the level of this standby tone. Condenser QB prevents direct current from by-passing the condenser QA. Condenser QC reduces harmonics in the tone, whilst resistor YB and condenser QD prevent sparking at the interrupter contacts N1 and help to shape the tone wave.

When the subscriber dials a function digit, momentary release of relay A for each dial pulse causes a circuit to be completed for the stepping magnet OM. At the end of the digit, relay C falls back and opens the circuit of relay D and after a time, determined by the release period of relay D, a circuit is closed for the switch restoring magnet ZM. Between the release of relays C and D a function magnet in the dictating apparatus, determined by the value of the digit dialled, is operated in a manner which will now be described.

To record, the digit 1 is dialled. The minor switch MS is stepped to its first position in which a ground pulse is received over the bank MS1 during the release time of relay D. Relay P operates and locks over its contacts P4 at the beginning of this ground pulse, whilst relay H remains unoperated because of the differential action of its two windings. When the ground pulse is removed on the release of relay D, relay H operates over its left hand winding alone, over contacts B2, F4, P4. Contacts H1 and P1 open the circuit to buzzer N to remove stand-by tone during recording, and closure of contacts P3 signal the dictating machine to start recording by connecting ground to the record lead 3 and thereby energizing a function magnet FM2 which clutches the recorder to the motor shaft. The party at station S2 now talks into his transmitter T.

Recording may be stopped by the sub-station again dialing the digit 1. The minor switch MS is now again stepped to its first position in which a ground pulse is again applied over the blank MS1, front contacts H2 of relay H to the right-hand winding of relay P.

Relay P releases at the beginning of this ground pulse because of the differential action of its two windings and relay H holds over its left hand winding to the end of this second ground pulse and then releases. At contacts P3 of relay P ground is thereby removed from the lead 3 to deenergize the function magnet FM2 to stop recording in the dictating machine. The circuit of the buzzer relay N is again closed and standby tone generated.

If the dictating machine becomes unavailable while recording, due for example, to power being shut off or some other safety function operation at the dictating machine, contacts Z1 are closed to connect ground to the lead 10. This ground is extended via rectifier MRA1 and contacts H3 of relay H to the right hand winding of relay P which releases and removes the "record" signal from lead 3. In this case relay H does not release. The circuit of buzzer relay N is closed via rectifier MRA and contacts C2 of relay C and stand-by tone is thus connected to the calling line.

It will thus be seen that the recording apparatus is placed in and out of "record" condition under control of alternate digits 1 and the application of stand-by tone indicates to the calling party that the apparatus is out of the "record" condition.

To signal a correction, the digit 2 is dialled. In this event ground is connected via the front contacts D2, back contacts C3, the minor switch wipers MS3 and bank terminal No. 2 to the lead 8 during the release time of relay D. This signal to the dictating machine causes a correction indication to be marked on an index tab at the recorder consequent upon the energization of a function magnet FM3. The transcriber by reference to the tab can tell where in the portion of the dictation the error has occurred.

To play back, digit 3 is dialled. In this case a relay K is operated over contacts C1, D1, wipers MS1, bank terminal No. 3, back contacts F2 and P2 and the right-hand winding of relay K. Relay K at contacts K3 opens the circuit of the buzzer N, and at contacts K1 closes a locking circuit for itself over front contacts B5 and the lead 13 which is normally grounded. At contacts K2 lead 6 is grounded and function magnet FM4 energized to effect play back in known manner. If the relays H and P are operated due to the dictating machine being in the "record" condition when digit 3 is dialled, the ground pulse from the minor switch wipers MS1 in position 3 is extended via back contacts K1 and rectifier MRA2, back contacts L1, front contacts H3 and H2 to release relay P and the remainder of the ground pulse is extended via contacts P2 to operate relay K.

If the play back period is exceeded, the dictating machine removes ground from the lead 13 at contacts Z3 which are arranged to be opened by a magnet energized in any suitable manner under this condition. The locking circuit of relay K is thus opened and at contacts K2 ground is removed from the playback lead 6. If the digit 2 (correction), the digit 4 (length) or the digit 0 (call attendant) is dialled while relay K is energized for playback, a circuit is closed during the release time of relay D via contacts K1, F2, P2, C4, D3, and switch wipers MS2 for the left-hand winding of relay K. Since the two windings of relay K are wound differentially the relay releases, unlocks, and removes ground from the playback lead 6.

To signal "length," the digit 4 is dialled. After completely dictating one letter and before commencing the dictation of a second, the dictator will dial 4 to indicate on the index tab the length of the letter which has just been dictated. In position 4 of the switch MS and during the release time of relay D, an obvious circuit is closed for the lower winding of relay L. At contacts L2 ground is momentarily removed from lead 5, deenergizing the function magnet FM1 and causing a "length" indication to be marked on the index tab in known manner. At contacts L1 a releasing ground is provided for relays H and P if these relays are operated by virtue of the circuit being in the "record" condition. At contacts L3 locking circuits are opened for relays J and M if these relays have been operated by dialling 0 to call the attendant in a manner to be described subsequently.

If it is desired to call the attendant, digit 0 is dialled. In this case during the release time of relay D, relay M is operated over its right-hand winding and normally locks over its left-hand winding and contacts M4, F3, K3, M1, P1, L3, B5 to lead 13 which is arranged to remain grounded over contacts Z4, Z2, Z3 until the attendant answers. This locking circuit will be opened also at contacts B5 when the calling party hangs up, or at contacts P1 (digit 1); K3 (digit 3); L3 (digit 4); or F3 (push button) if digits 1, 3 or 4 are dialled, or if the handset push button is depressed.

Relay M at contacts M2 closes a circuit over lead 7 for the lamp SL1 to signal the attendant, who by actuating key K1 is able to connect his telephone set AT to the trunk DT1 and converse with the caller. At contacts M1 the circuit of relay J is opened if this has been operated in order to cancel the effect of a previous pushbutton operation and to shunt contacts H1 to prepare the locking circuit for the left hand winding of relay M, since relays P and H are both released by the grounded pulse over wipers MS1 and contacts M3.

If the availability lead 10 is grounded because the dictating machine becomes unavailable, relay M will lock over its right-hand winding, contact M3, rectifier MRA1 and contacts B4. In this case the circuit of the signal lamp can be opened only by the attendant answering and removing ground from lead 10 or by the calling party disconnecting. When the attendant answers, ground is also removed from lead 13 by opening contacts Z4 in any convenient manner, the circuit of the buzzer relay N is opened and stand-by tone is removed.

If a station, such as S1, equipped with a pushbutton PB for recording calls, an idle dictating trunk and machine is seized by dialling a first digit 9 as previously described in connection with a call from station S2. For 0–300 ohm loops the pushbutton is connected to insert, when operated, a 680 ohm resistance R1 in the loop. For 0–600 ohm loops a shorting strap ST is removed from an additional 620 ohm resistor R2 so that the operation of the pushbutton inserts a resistance of 1300 ohms in the substation loop.

The dialling of digit 2 (correction), digit 3 (playback), digit 4 (length) and digit 0 (call attendant) actuate the pulsing relay A in the trunk circuit TC1 to cause the performance of the respective functions at the dictating machine, as already described.

Relay E, Fig. 2, is a differential relay the upper winding of which is connected to the right-hand winding of relay A, whilst the lower winding of relay E is connected over contacts A2 of relay A and resistor YC or YC plus YD to the lower winding of retardation coil G. Resistor YC (500 ohms) only is used with station loops of 0–300 ohms, whilst with station loops of 0–600 ohms the strap is removed from resistor YD. Oppositely poled rectifiers MRB1, MRB2 are respectively connected across the ends of the windings of relay E and of the retardation coil G. Rectifier MRB1 acts to maintain the differential condition of relay E under normal loop conditions and to block reverse current when the substation pushbutton is depressed. Rectifier MRB2 acts to maintain an impedance balance between the "+" and "−" lines and ground.

When relay A operates responsive to closure of the loop but with the pushbutton PB at the station S1 unactuated, relay E does not operate because current through its balanced windings set up equal and opposing electromagnetic forces which cancel out. This condition of balance is maintained for any loop resistance such that the loop current exceeds the current through resistor YC (or YC plus YD) and contacts A2 because the rectifier MRB1 is conducting in this condition. Since the relay A responds to the dial at the station S1 the subscriber is able to effect recording and stopping of the dictating machine but usually he will actuate the pushbutton PB for this purpose. When the pushbutton PB is depressed the line resistance is increased, which reduces the current through the loop and through the upper winding of reilay E. Rectifier MRB1 is blocking in this condition with the result that the cancelling effect is lost and relay E operates due to the unbalanced current through its lower winding, contacts A2, resistor YC (or YC plus YD) and retardation coil G. Relay A remains operated on reduced line current when the pushbutton PB is depressed. Relay E will alternately operate and release if the party at station S1 actuates his dial, but this is without effect because the minor switch MS immediately steps off normal and opens the back contacts of spring CM1 before slow acting relay F can operate.

Relay F is a helping relay to relay E and operates over contacts E1 only when the pushbutton is depressed to record. Relay F at contacts F1 grounds the lead 3 to energize the function magnet FM2 in the dictating machine to commence recording. When the pushbutton is released relays E and F restore and recording is stopped.

At contacts F4 the locking circuits to relays H and P are opened to cancel the effect of a previous digit 1 (record) which may have been dialled. Contacts F3 open the circuit to the buzzer relay N to remove standby tone and open the locking circuit to relay M to cancel the effect of a preceding digit 0 which may have been dialled to call the attendant.

Relay J is also energized over contacts F3 via contacts K3, H1, P1, L3, B5 to the lead 13 and locks over its contacts J2. At contacts J1 the normal operating circuit to buzzer relay N is opened so that standby tone is not returned between operations of the pushbutton PB at the substation.

Rectifiers MRA, MRA1, MRA2, MRA3 are inserted to block various back circuits to prevent false relay operation.

While we have described above the principles of our invention in connection with specific apparatus, it is to be clearly understood that this description is made only by way of example and not as a limitation to the scope of our invention.

What is claimed is:

1. In a dictation recording system, lines having respective stations thereon each equipped with an impulse sender for transmitting digit impulses for controlling switching apparatus, a dictation trunk having a dictation machine connected thereto, switching apparatus for connecting said dictation trunk to any one of said lines in a calling condition, switch means associated with said dictation machine for controlling its starting and stopping and means associated with said dictation trunk for controlling said switch means to start and stop said dictation machine alternately, responsive to the repeated transmission of the same predetermined digit from said impulse sender.

2. A dictation recording system according to claim 1, comprising further means associated with said dictation trunk for controlling other functions of said dictation machine responsive to the transmission of other predetermined digits from said impulse sender.

3. A dictation recording system according to claim 1, whrein said means associated with said dictation trunk for controlling said switch means comprises means responsive to the repeated transmission of a single impulse to alternately start and stop said machine.

4. A dictation recording systm according to claim 1, further comprising switch means at at least one of said stations, means for changing the elctrical condition of said station loop circuit responsive to the actuation of said last-mentiond switch means, and means associated with said dictation trunk responsive to a change in the electrical condition of said loop circuit for controlling the starting and stopping of said dictation machine.

5. A dictation recording system according to claim 1, comprising a pair of talking conductors extending from each said station, switch means at at least one of said stations, means for changing the resistance of the station loop extending to said conductors responsive to the actuation of said last-mentioned switch means, and means associated with said dictation trunk responsive to the variation of the station loop resistance for controlling the starting and stopping of said dictation machine.

6. In a dictation recording system, lines having respective stations thereon each equipped with an impulse sender for transmitting digit impulses for controlling switching apparatus, a dictation trunk having a dictation machine connected thereto, switching apparatus for connecting said dictation trunk to any one of said lines in a calling condition, switch means associated with said dictation machine for controlling its starting and stopping, manually operable switch means at at least one of said stations, means for changing an electrical characteristic of a circuit extending from said station to said dictation trunk responsive to the actuation of said last-mentioned switch means, means associated with said dictation trunk for controlling said switch means associated with said dictation trunk responsive to said changes of said electrical characteristic, and other means associated with said dictation trunk for controlling said switch means associated with said dictation trunk responsive to impulses transmitted by the impulse sender at any one of said stations, said other means adapted to exercise said control independent of said changes of electrical characteristic.

7. In a dictation recording system, lines having respective stations thereon each equipped with an impulse sender for transmitting digit impulses for controlling switch apparatus, a dictation trunk having a dictation machine connected thereto, switching apparatus for connecting said dictation trunk to any one of said lines in a calling condition, switch means associated with said dictation machine for controlling its starting and stopping, manually operable switch means at at least one of said stations, means for changing the resistance of the loop circuit extending from said station to said dictation trunk responsive to the actuation of said manually operable switch means, means associated with said dictation trunk for controlling said switch means associated with said dictating machine responsive to said changes of resistance, and other means associated with said dictation trunk for controlling said switch means associated with said dictation trunk responsive to impulses transmitted by the impulse sender at any one of said stations.

8. A dictation recording system according to claim 7, comprising a pulsing relay connected to the talking conductors of said dictation trunk, a multi-position minor switch associated with said dictation trunk, means for selectively positioning said minor switch under control of said pulsing relay, a control relay connected to a bank contact of said minor switch in its first position, means for alternately operating and releasing said relay as said minor switch is successively moved into its first position, a recording control circuit extending to said dictating machine, and contacts of said control relay included in said last-mentioned circuit.

9. A dictation recording system according to claim 7, comprising a pulsing relay connected to the talking conductors of said dictation trunk, a first slow-release relay connected in a circuit including back contacts of said pulsing relay, a second slow release relay connected in a circuit including front contacts of said first slow-release relay, a multi-position minor switch associated with said dictation trunk, means for selectively positioning said minor switch under control of said pulsing relay, front contacts of said second slow release relay connected in a circuit to apply potential to a bank contact of said minor switch at the end of transmission of one or more impulses representing a digit responded to by said pulsing relay, first and second two winding differential relays each having one winding normally connected to a bank contact of said minor switch in its first position and its other winding connected in a circuit controlled by contacts of the other relay, a recording control circuit extending to said dictating machine and contacts of one of said differential relays included in said control circuit.

10. A dictation recording system according to claim 7, comprising a double-wound differential relay both windings of which are normally connected at one of their ends to the same battery potential and at the other of their ends to one conductor of said dictation trunk, a unilateral current conducting device included in the connection between one said winding and said conductor, a further circuit for said last-mentioned winding extending to opposite battery potential and including a resistance related to the line resistance which is present when said manually operable switch means is actuated to change the resistance of the station loop, a recording control circuit extending to said dictating machine, and means controlled by said differential relay for opening and closing said recording control circuit.

11. A dictation recording system according to claim 7, comprising a pulsing relay connected to the talking conductors of said dictation trunk, a first slow-release relay connected in a circuit including back contacts of said pulsing relay, a second slow release relay connected in a circuit including front contacts of said first slow-release relay, a multi-position minor switch associated with said dictation trunk, means for selectively positioning said minor switch under control of said pulsing relay, front contacts of said second slow-release relay connected in a circuit to apply potential to a selected bank contact of said minor switch, a release magnet for restoring said minor switch, and a circuit for said release magnet including back contacts of said first slow-release relay and back contacts of said second slow-release relay.

References Cited in the file of this patent

UNITED STATES PATENTS 2,200,351 Whitehead et al. -------- May 14, 1950